US009229516B2

United States Patent
Hiltunen et al.

(10) Patent No.: US 9,229,516 B2
(45) Date of Patent: Jan. 5, 2016

(54) METHODS, DEVICES, AND COMPUTER PROGRAM PRODUCTS FOR MAINTAINING NETWORK PRESENCE WHILE CONSERVING POWER CONSUMPTION

(75) Inventors: Matti Hiltunen, Chatham, NJ (US); Nilton Bila, Toronto (CA); Kaustubh Joshi, Scotch Plain, NJ (US); Horacio Andres Lagar Cavilla, Morris Plains, NJ (US); Eyal de Lara, Toronto (CA)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1355 days.

(21) Appl. No.: 12/909,211

(22) Filed: Oct. 21, 2010

(65) Prior Publication Data

US 2012/0102084 A1    Apr. 26, 2012

(51) Int. Cl.
*G06F 1/00* (2006.01)
*G06F 1/32* (2006.01)

(52) U.S. Cl.
CPC .............. *G06F 1/32* (2013.01); *G06F 1/3203* (2013.01); *G06F 1/3209* (2013.01)

(58) Field of Classification Search
USPC ........................... 709/201, 223, 226; 713/323
See application file for complete search history.

(56) References Cited

U.S. PATENT DOCUMENTS

| 8,271,814 | B2* | 9/2012 | Padmanabhan et al. ....... 713/310 |
| 2011/0252256 | A1* | 10/2011 | Morris ........................... 713/323 |
| 2011/0307887 | A1* | 12/2011 | Huang et al. ...................... 718/1 |
| 2012/0005670 | A1* | 1/2012 | Driesen et al. .................... 718/1 |
| 2012/0030356 | A1* | 2/2012 | Fletcher ......................... 709/226 |
| 2012/0047240 | A1* | 2/2012 | Keohane et al. ............... 709/221 |
| 2013/0024710 | A1* | 1/2013 | Jackson ......................... 713/323 |

OTHER PUBLICATIONS

Zhang et al., "Fast Restore of Checkpointed Memory Using Working Set Estimation", SOSP Work-In-Progress Poster Session, Big Sky, MT (Oct. 13, 2009).
Das at al., "LiteGreen: Saving Energy in Networked Desktops Using Virtualization", USENIX Federated Conferences Week, Boston, MA (Jun. 23, 2010).
Bila at al., "The Case for Energy-Oriented Partial Desktop Migration", USENIX Federated Conferences Week, Boston, MA (Jun. 22, 2010).
Lagar-Cavilla et al., "SnowFlock: Rapid Virtual Machine Cloning for Cloud Computing", EuroSys '09 (Apr. 1-3, 2009).
Gupta at al., "To Infinity and Beyond: Time-Warped Network Emulation", (2006).

* cited by examiner

*Primary Examiner* — Jerry Dennison
(74) *Attorney, Agent, or Firm* — Gardner Groff Greenwald & Villanueva, PC

(57) ABSTRACT

Network presence of a computing device in a cloud computing network is maintained while power consumption of the computing device is reduced. When the computing device is determined to enter an idle state, at least some of the operations of the computing device running in a virtual machine environment are migrated to a server within the cloud computing network while maintaining connectivity of the computing device to the cloud computing network. When the computing device is determined to be in the idle state, the computing device is put into a sleep mode to reduce power consumption of the computing device. When the computing device is determined to be in an active state, the computing device is woken, and the migrated operations are returned from the server to the computing device. This reduces power consumption of the computing device while maintaining the network presence of the computing device in the cloud computing network.

19 Claims, 3 Drawing Sheets

METHODS, DEVICES, AND COMPUTER PROGRAM PRODUCTS FOR MAINTAINING NETWORK PRESENCE WHILE CONSERVING POWER CONSUMPTION

TECHNICAL FIELD

The present disclosure relates generally to computing devices, and more particularly, to conserving power consumption of computing devices.

BACKGROUND

Desktop and notebook computers running in enterprises and residential settings consume a significant amount of energy even when they are idle. Studies have shown that idle power consumption may be up to approximately 40% of a computer's peak power demands. Turning desktop or notebook computers off or putting them into deep sleep/hibernation modes may eliminate this consumption. However, desktop and notebook computers typically run a number of applications with always-on semantics, many of them requiring persistent network presence, such as VoIP, IM, email, personal media sharing, etc. Turning the computers off or putting them in sleep mode affects the usability of the desktop or notebook computers by preventing them from participating in background activity, such as network resource discovery, operating system (OS) and software updates, peer-to-peer file-sharing, and remote access. Further, there are commonly instances in which desktop computers experience periods of brief idleness interspersed with active use.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method maintains network presence of a computing device within a cloud computing network while reducing power consumption of the computing device. The method includes determining when the computing device enters an idle state, wherein the computing device is connected to the cloud computing network. When the computing devices enters the idle state, at least some of the operations of the computing device running in a virtual machine environment are migrated to a server within the cloud computing network while maintaining connectivity of the computing device to the cloud computing network. The method further includes putting the computing device into a sleep mode when the computing device is determined to be in the idle state, thereby reducing power consumption of the computing device while maintaining the network presence of the computing device in the cloud computing network.

According to another embodiment, a non-transitory computer program product includes a storage medium upon which instructions are recorded that, when executed by a processor, perform a method for maintaining network presence of a computing device within a cloud computing network while reducing power consumption of the computing device. The method includes determining when the computing device enters an idle state, wherein the computing device is connected to a cloud computing network. When the computing device enters the idle state, at least some of the operations of the computing device running in a virtual machine environment are migrated to a server within the cloud computing network while maintaining connectivity of the computing device to the cloud computing network. The method further includes putting the computing device into a sleep mode when the computing device is determined to be in the idle state, thereby reducing power consumption of the computing device while maintaining network presence of the computing device in the cloud computing network.

According to another embodiment, a device maintains network presence of a computing device within a cloud computing network while reducing power consumption of the computing device. The device includes an interface connecting the computing device to the cloud computing network and a processor for determining when the computing device enters an idle state and migrating at least some operations of the computing device running in a virtual machine environment to a server within the cloud computing network when the computing device is in the idle state while maintaining connectivity of the computing device to the cloud computing network. The processor also puts the computing device into a sleep mode when the computing device is determined to be in the idle state, thereby reducing power consumption of the computing device while maintaining the network presence of the computing device in the cloud computing network

DETAILED DESCRIPTION

Figure 1:
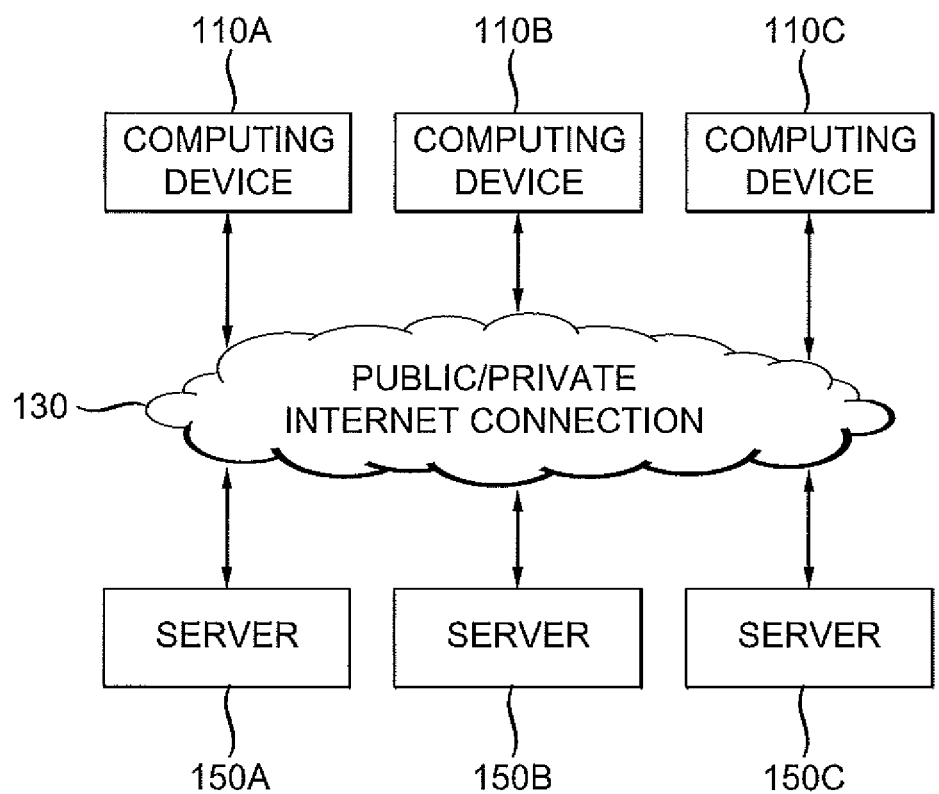
FIG. 1 illustrates an exemplary environment in which computing device network connectivity may be maintained while reducing power consumption according to an exemplary embodiment.

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Computing devices, such as desktop machines and notebook computers (commonly referred to herein as "desktop" machines or devices), often need to be shut down or put into a sleep mode to reduce power consumption and achieve energy savings. However, it is also important that a computing device maintains a network presence so they it may participate in background activity.

For ease of explanation, computing devices are referred to throughout this disclosure as "desktop machines". However, it should be appreciated that computing devices may include other devices, such as notebook computers.

According to exemplary embodiments, a network presence is maintained for desktop machines while they are in sleep mode, and the power-cycling of the desktop machines is transparent to local and network users. This may be achieved by powering down a desktop machine when it is determined to be idle while simultaneously deploying another computing element within a central server, referred to herein as a "network-presence" proxy. The network-presence proxy takes over a subset of the desktop machine's computing functions. According to an exemplary embodiment, the network-presence proxy is effectively a subset of the original desktop machine in terms of computational states.

According to exemplary embodiments, a computing element referred to herein as a "desktop proxy" may be implemented within the desktop machine as an application that may be executed by a processor within the desktop machine, as described in further detail below with reference to FIG. 3. The desktop proxy monitors the desktop machine to keep track of a working set of memory and disk pages being used. The desktop proxy is also responsible for determining when a desktop machine is idle, initiating migration of a working set of operations to a central server, putting the desktop machine to sleep, detecting activity indicating that the desktop device should be woken up, and initiating the transfer of operations back from the server.

According to one embodiment, only the elements necessary for maintaining transparency are off-loaded from the desktop machine to the network-presence proxy. If a non-offloaded service is required, the original desktop machine is powered and asked to provide the service. For example, if a server hosting the network-presence proxy determines that some of the memory/disk pages it needs are missing, the server may initiate wake-up of the desktop machine via a Wake-on-LAN or Wake-on-Wireless LAN protocol.

According to an exemplary embodiment, power consumption reduction and energy savings may be obtained using such network-presence proxy elements while putting multiple desktop machines in sleep mode, as the idle power consumption of such network-proxy elements running on a server is lower than the combined idle power consumption of the desktop machines that are put into the sleep mode. The more desktop machines that are put into sleep mode, the greater the reduction in power. While some energy is consumed during the offloading process, the difference in power consumption between the network-presence proxies and the desktop machines is sufficient for energy savings, and the sleep state may be sustained long enough to recover any additional energy consumption due to the offloading process According to an exemplary embodiment, a desktop machine may be modified such that its operating system runs inside a virtual machine environment. Virtual machine (VM) technology is widely adapted as an enabler of cloud computing. Cloud computing is transforming the computing landscape by shifting the hardware and staffic costs of managing a computation central to third parties. Small organizations and individuals are now able to deploy world-scale services by paying for the marginal cost of actual resource usage. Virtualization provides many benefits, including security, performance isolation, ease of management and flexibility or running in a user-customized environment.

According to an exemplary embodiment, the desktop proxy runs inside the desktop operating system (OS) as a background process or inside a virtual machine monitor (VMM) of the desktop machine. The network-presence proxy contains a modification to the VMM to only allocate memory sufficient for the working set. Thus, the network-presence proxy may be simply a portion of the desktop VM environment that includes the machine state necessary for executing, e.g., VCPU registers, OS data structures, etc., and a small set of memory and disk pages that are needed by the network-presence proxy to execute functions that are typically invoked when the host is idle during off-peak hours.

The network-presence proxy may be executed in a VM environment that runs on a shared central sever within the cloud computing network. The server may also host the proxies of many other desktop machines. By encapsulating the desktop session in a VM, the desktop VM may be temporarily staged in a consolidated backend server or cloud during idle periods of the desktop machine, allowing the actual physical desktop to be put to sleep.

When transferring the VM desktop session back from the central server to the desktop machine, the only data that needs to be transferred are the dirty memory pages/disk blocks that were written to since the last time the desktop machine was woken up (for transferring the modified working set). The amount of data transferred is very small, e.g., 110 MB out of a total of 13 GB in a VM state. Also, according to an exemplary embodiment, the VM session is migrated back to the desktop machine using a "post-copy" model in which memory is transferred after the VM session is logically migrated from the central server to the desktop machine rather than using a "pre-copy" memory transfer model in which all memory is transferred before VM control is transferred. This leads to much quicker waking up of the desktop machine.

To aid in understanding, FIG. 1 illustrates an exemplary environment in which computing device network connectivity may be maintained while reducing power consumption according to an exemplary embodiment. Computing devices 110A, 110B and 110C are devices that, when idle for a predetermined period of time, may be put at least partially into sleep mode. These computing devices may include desktop machines, as commonly referred to throughout this disclosure, or other types of computing devices that may experience idle periods but need to maintain network presence. The computing devices 110A, 110B, and 110C may be connected to a network 130 via any suitable wired or wireless connection. While in sleep mode, at least some of the operations of the devices 110A, 110B, and 110C are migrated to one or more servers 150A, 150B, and 150C via the network 130. The network 130 may be a cloud network which may include a third-party infrastructure, such as a service (IaaS) cloud, an intranet backend, or even a federation of other computers in the same domain. Although shown as discrete devices, the servers 150A, 150B, and 150C may be integrated within one or more devices in the cloud computing network 130. Migrating at least some of the operations from the computing devices 110A, 110B, and 110C to various servers 150A, 150B, and 150C reduces power consumption of the devices 110A, 110B and 110C while maintaining network connectivity to the migrated operations.

Although three computing devices 110A, 110B, and 110C and three servers 150A, 150B, and 150C are shown in the interest of simplicity, it should be appreciated that any number of computing devices and any number of servers may be used, as appropriate.

According to an exemplary embodiment, the behavior of the computing devices 110A, 110B, and 110C may be monitored to determine when a device transitions to a period of idleness and whether the trade-off of offloading to a network-presence proxy will be worth the effort. If the amount of CPU used by a desktop machines and the size of the working set (including memory and disk pages) is below a predetermined threshold, then it may be worthwhile to offload operations to the network-presence proxy. Also, there may be a threshold period of idleness that, when exceeded, makes offloading operations worthwhile. This threshold may be workload dependent, as the period of idleness may include various levels of computational activities running on the desktop machine, though there is no active use by a user. For example, if a desktop machine has no background tasks being executed, a threshold period of idleness of 60 seconds may be sufficient to indicate that operations should be migrated. If the desktop is very busy with multiple background tasks executing, it may not be worth the effort to migrate operations from the desktop unless the period of idleness exceeds, e.g., 600 seconds.

When a device is determined to be idle, and the trade-off of offloading is determined to be worth the effort, an estimation of an idle working set of the device is constructed, including a set of OS structures and memory and disk pages that will be needed to perform background and network-presence tasks during the predicted period of idleness.

When a period of sufficient idleness is predicted, and an idle working set is constructed, the VM session may be partially migrated from the appropriate device(s) 110A, 110B, and/or 110C to the appropriate backend consolidated server 150A, 150B, and/or 150C. According to an exemplary embodiment, only the portion of the operations of the desktop machine included in the idle working set is migrated. It is estimated that the idle working set is at least two orders of magnitudes smaller than the full VM session of a computing device (e.g., tens of MBs versus tens of GBs). Consequently, by only migrating the idle working set of a computing device 110A, 110B, 110C to a backend server 150A, 150B, 150C, orders of magnitude of consolidation may be achieved. Also, migrating only the idle working set results in faster migration than would be achieved by migrating an entire VM session. Once the partial migration is complete, the desktop machine OS continues to execute the VM session on the shared central server and responds to any network request. If any disk block needed is not in the migrated working set, the desktop machine may be woken up to transfer the block as needed.

According to exemplary embodiment, the always-on semantics of the computing devices 110A, 110B, and 110C are retained so that the desktop sessions never sleep. When the idle period is over, e.g., the user interacts with one of the devices 110A, 110B, or 110C, or significant background activity is detected in one of the devices, such as system updates or virus checks, that device is woken up, and the VM session is migrated from the appropriate one of the servers 150A, 150B, and 150C back on to the device. This allows the devices 110A, 110B, and 110C to support hardware-based acceleration of graphics and multimedia, which may be a challenge for thin client-based solutions in terms of consolidation and power savings.

By migrating only the idle working set of operations of an idle desktop machine to a network-presence proxy in a server, even in spite of background activity, very little memory needs to be accessed. If the idle working set is small enough, then a very large number of desktop sessions may be consolidated in a small set of cloud host servers. In addition, because only limited states need to be transferred, migration may be performed almost instantaneously and at lower energy cost, creating opportunities to save desktop power even for short periods of idleness.

Further, by only transferring this working set, a significant amount of bandwidth and power may be conserved, and the migration may be done in a short amount of time. This is especially important for devices connected via wireless interfaces (such as WiFi or cellular networks) in which bandwidth is limited and data transmission may use a lot of energy and reduce battery life. According to exemplary embodiments, battery power may be conserved by allowing laptop devices to sleep for short periods of time in situations in which they would normally not be able to do so (e.g., when a background computation or chat session is running while the user is away from a laptop device).

The small idle working set and dynamic memory allocation on the server saves significant amounts of central server memory, which is expected to be a bottleneck resource when large numbers of idle desktops are to be packed into a small number of central servers. This allows for higher consolidation ratios than would be possible using an approach that transfers the entire VM and improves the power efficiency of the approach.

According to exemplary embodiment, significant energy savings may be obtained by allowing desktop machines to be powered down most of the time when not actively used by their users. This entire process is transparent to any network users of the desktop machine who would only see a small delay while the execution is being transferred between the server and the desktop device.

Figure 2:
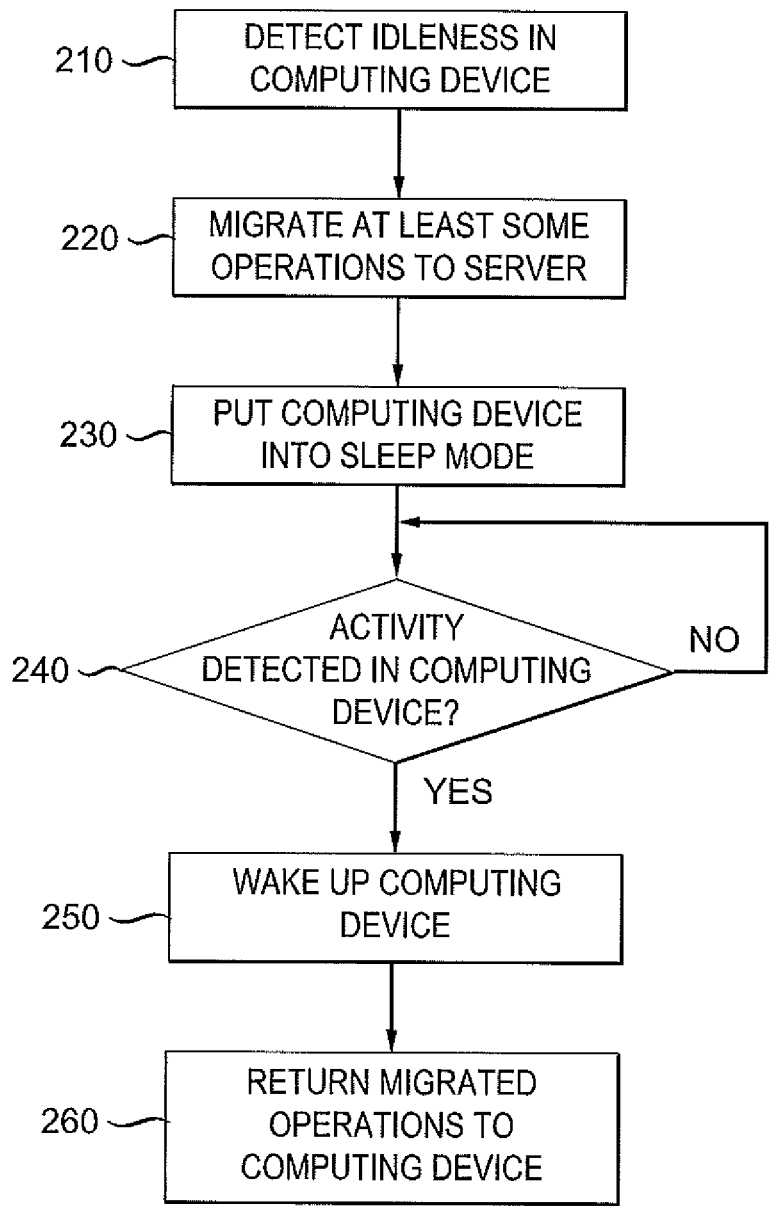
FIG. 2 illustrates a method for maintaining computer device network connectivity while reducing power consumption according to an exemplary embodiment.

FIG. 2 illustrates a method for maintaining computer device network connectivity while reducing power consumption according to an exemplary embodiment. The steps shown in FIG. 2 may be performed by a processor in each computing device 110A, 110B, and 110C, as described in further detail with reference to FIG. 3 below At step 210, one or more the computing devices 110A, 110B and 110C are determined to be in an idle state, e.g., by detecting idleness in the computing devices. Idleness may be detected as a lack of activity over a predetermined period of time, taking into account background tasks being executed. At step 220, at least some of the operations of the computing device(s) 110A, 110B, and 110C are migrated to one or more servers 150A, 150B, and 150C via the network 30, while maintaining network connectivity of the computing device. The devices for which operations have been migrated are put into sleep mode at step 230, thereby reducing power consumption of those computing devices.

At step 240, a determination is made whether any of the computing devices 110A, 110B, and 110C have entered an active state, e.g., by determining whether sufficient activity is detected in any of the computing devices 110A, 110B, and 110C, that have been put into sleep mode such that they need to be woken up. Examples of activity that may be sufficient to cause the computing devices 110A, 110B, and 110C to be woken up may include activation of external peripherals connected to the devices 110A, 110B, and 110C by, e.g., a user wiggling a mouse, pressing a keyboard key, pressing a CD eject button, etc. In the absence of peripheral activity, processing that warrants the need for a VM state not present at the servers 150A, 150B, and 150C may trigger wake up. An example of such processing may include initiation of a new background task not previously executed, such as a disk indexer. If sufficient activity is detected at step 240, the appropriate device (or devices) is woken up at step 250. Such wake-up may be automatically initiated by the desktop machine. At step 260, the migrated operations are returned from the servers 150A, 150B, and 150C to the computing device or devices that have been woken up. Otherwise, the devices that have been put into sleep mode are repeatedly monitored until they become active.

Although not shown in FIG. 2 in the interest of simplifying the illustration, it should be appreciated that additional steps may be performed after operations are migrated from a computing device, and the computing device is put to sleep. For example, a determination may be made whether any of the operations migrated to the servers 150A, 150B, and 150C require memory/disk pages that are not included in the migrated working set. If not, monitoring of the computing devices 110A, 110B, and 110C continues. If additional memory/disk pages are required, a determination may be made whether it would be beneficial to fetch the additional memory/pages from the respective computing device to the server needing the additional memory/pages or whether it would be better to migrate the operations from the server back to the computing device. For example, if the amount of memory or the number of pages needed by the operation, outside of the working set, exceeds a predefined threshold, e.g., greater than 5% of the working set, in a predefined time window, e.g., 2 minutes, then the computing device may be woken up, and the operations may be migrated back to the computing device. Otherwise, the additional memory/disk pages may be simply fetched from the computing device.

Figure 3:
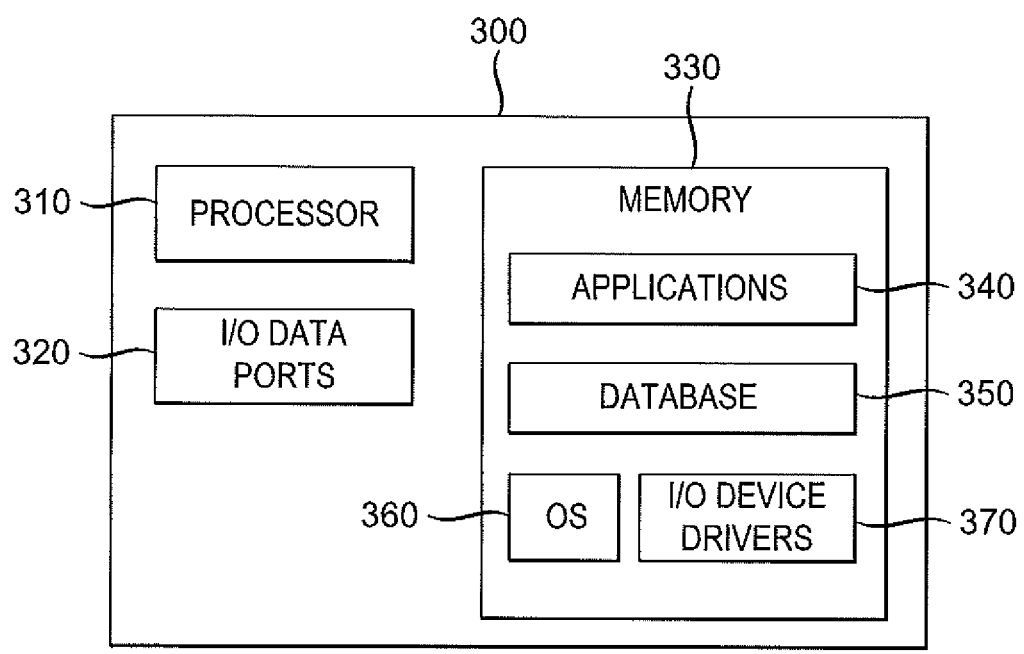
FIG. 3 illustrates a block diagram of a device for maintaining computer device network connectivity while reducing power consumption according to an exemplary embodiment.

FIG. 3 is a block diagram of a device for providing customized user information according to one embodiment. The device may be included in each of the computing devices 110A, 110B, and 110C. The device 300 includes a processor 310 that receives information and transmits information via I/O Data Ports 320. The I/O Data Ports 320 may be implemented with, e.g., an interface including an antenna or other suitable type of transceiver through which data and signals may be transmitted and received. It should be appreciated that the I/O Data Ports 320 may be used for communications between the computing devices 110A, 110B, and 110C and the servers 150A, 150B and 150C via the network 130.

The processor 310 communicates with the memory 330 via, e.g., an address/data bus. The processor 310 may be any commercially available or customer microprocessor. The memory is 330 is representative of the overall hierarchy of memory devices containing the software and data used to implement the functionality of the device 300. The memory 330 may include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 may be stored in the memory 330 and/or in a firmware (not shown) as executable instructions, and may be executed by the processor 310. The applications 340 include various programs, including, e.g., a desktop proxy, that, when executed by the processor, implement the various features of the device 300, including applications for determining when a computing device is in an idle state, for migrating at least some of the operations of the computing device and putting the computing device into a sleep mode, for detecting activity in the computing device, for determining whether memory/disk pages that are not in the working set are needed to perform the migrated operations, and for fetching additional pages when appropriate and/or waking the computing device up and returning migrated operations to the computing device. The database 350 represents the static and dynamic data used by the applications 340, the OS 360, the I/O device drivers 370 and other software programs that may reside in the memory. The database 350 may include, for example, stored information regarding a period of time of idleness indicating that operations of a device need to be migrated, a level or predetermined duration of activity indicating that migrated operations need to be returned, etc.

While the memory 330 is illustrated as residing proximate the processor 310, it should be understood that at least a portion of the memory 330 may be a remotely accessed storage system, for example, a server on a communication network, a remote hard disk drive, a removable storage medium, combinations thereof, and the like. Thus, any of the data, applications, and/or software described above may be stored within the memory 330 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure may be implemented. While the description refers to computer-readable instructions, the present disclosure also may be implemented in combination with other program modules and/or as a combination of hardware and software in addition to, or in stead of, computer readable instructions. The term "application," or variants thereof, is used expansively herein to include routines, program modules, programs, components, data structures, algorithms, and the like. Applications may be implemented on various system configurations, including single-processor or multiprocessor systems, minicomputers, mainframe computers, personal computers, hand-held computing devices, microprocessor-based, programmable consumer electronics, combinations thereof, and the like.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   determining, by a computing device, based on a workload and a period of idleness of the computing device, that the computing device has entered an idle state, wherein:
      the computing device is connected to a cloud computing network; and
      the determining comprises comparing the period of idleness to a variable threshold period of idleness, the variable threshold period of idleness varying depending on the workload, wherein the workload includes background activities running on the computing device;
   migrating, when the computing device is in the idle state, at least some operations of the computing device, running in a virtual machine environment, to a server within a cloud computing network while maintaining connectivity of the computing device to the cloud computing network; and
   putting the computing device into a sleep mode when the computing device is determined to be in the idle state, thereby reducing power consumption of the computing device and maintaining a network presence of the computing device in the cloud computing network.

2. The method of claim 1, further comprising:
   determining that the computing device has entered an active state;
   waking, when the computing device is in the active state, the computing device; and
   returning the migrated operations from the server within the cloud computing network to the computing device when the computing device is determined to be in the active state.

3. The method of claim 1, wherein only a portion of the operations of the computing device operating in the virtual machine environment is migrated to the server.

4. The method of claim 3, wherein the portion of the operations of the computing device migrated to the server includes a working set of operations of the computing device.

5. The method of claim 4, wherein the working set of operations includes a machine state and sufficient memory and disk pages for executing functions historically invoked by the computing device during off-peak hours.

6. The method of claim 2, wherein determining that the computing device has entered an active state is based upon detected user interaction with the computing device and a predetermined level of background activity running on the computing device.

7. The method of claim 1, further comprising:
   determining that other computing devices connected to the cloud computing network have entered idle states;
   migrating, when the other computing devices are in the idle states, at least some operations of the other computing devices running in virtual machine environments to the server within the cloud computing network while maintaining connectivity of the computing device to the cloud computing network; and
   putting the other computing device into sleep modes when the other computing devices are determined to be in idle states, thereby reducing power consumption of the other computing devices and maintaining presence of the other computing devices in the cloud computing network.

8. A computer program product including a non-transitory storage medium upon which instructions are recorded that, when executed by a processor in a computing device, cause the processor to perform a method, the method comprising:
   determining, by the processor, based on a workload and a period of idleness of the computing device, that the computing device has entered an idle state, wherein:
      the computing device is connected to a cloud computing network; and
      the determining comprises comparing the period of idleness to a variable threshold period of idleness, the variable threshold period of idleness varying depending on the workload, wherein the workload includes background activities running on the computing device;
   migrating, when the computing device is in the idle state, at least some operations of the computing device running in a virtual machine environment to a server within a cloud computing network while maintaining connectivity of the computing device to the cloud computing network; and
   putting the computing device into a sleep mode when the computing device is determined to be in the idle state, thereby reducing power consumption of the computing device and maintaining a network presence of the computing device in the cloud computing network.

9. The computer program product including the non-transitory storage medium of claim 8, wherein the method further comprises:
   determining that the computing device has entered an active state;
   waking, when the computing device is in the active state, the computing device; and
   returning the migrated operations from the server within the cloud computing network to the computing device when the computing device is determined to be in the active state.

10. The computer program product including the non-transitory storage medium of claim 8, wherein only a portion of the operations of the computing device operating in the virtual machine environment is migrated to the server.

11. The computer program product including the non-transitory storage medium of claim 10, wherein the portion of the operations of the computing device migrated to the server includes a working set of operations of the computing device.

12. The computer program product including the non-transitory storage medium of claim 8, wherein the working set of operations includes a machine state and sufficient memory and disk pages for executing functions historically invoked by the computing device during off-peak hours.

13. The computer program product including the non-transitory storage medium of claim 9, wherein determining that the computing device enters the active state is based upon detected user interaction with the computing device and a predetermined level of background activity running on the computing device.

14. The computer program product including the non-transitory storage medium of claim 8, wherein the method further comprises:
   determining that other computing devices connected to the cloud computing network have entered idle states;
   migrating, when the other computing devices are in the idle states, at least some operations of the other computing devices running in virtual machine environments to the server within the cloud computing network while maintaining connectivity of the computing device to the cloud computing network; and
   putting the other computing device into sleep modes when the other computing devices are determined to be in idle states, thereby reducing power consumption of the other computing devices and maintaining presence of the other computing devices in the cloud computing network.

15. A computing device connected to a cloud computing network, the computing device comprising:
   a processor; and
   a memory having instructions stored thereon which, when executed by the processor, cause the processor to perform:
      determining, based on a workload and a period of idleness of the computing device, that the computing device has entered an idle state, wherein the determining comprises comparing the period of idleness to a variable threshold period of idleness, the variable threshold period of idleness varying depending on the being workload, wherein the workload includes background activities running on the computing device,
      migrating at least some operations of the computing device running in a virtual machine environment to a server within a cloud computing network while maintaining connectivity of the computing device to the cloud computing network; and putting the computing device into a sleep mode when the computing device is determined to be in the idle state, thereby reducing power consumption of the computing device, while maintaining a network presence of the computing device in the cloud computing network.

16. The device of claim 15, wherein the processor determines that the computing device has entered an active state, wakes the computing device when the computing device is in the active state, and returns the migrated operations from the server in the cloud computing network to the computing device when the computing device is determined to be in the active state.

17. The device of claim 15, wherein only a portion of the operations of the computing device including a working set of operations of the computing device is migrated to the server.

18. The device of claim 17, wherein the working set of operations includes a machine state and sufficient memory and disk pages for executing functions historically invoked by the computing device during off-peak hours.

19. The device of claim 16, wherein the processor determines that the computing device has entered the active state based upon detected user interaction with the computing device and a predetermined level of background activity running on the computing device.

* * * * *